United States Patent [19]

Bemel

[11] Patent Number: 5,367,131
[45] Date of Patent: Nov. 22, 1994

[54] APPARATUS FOR TREATING HYDROCARBON AND CARBON MONOXIDE GASES

[76] Inventor: Milton M. Bemel, 5716 N. 10th St., No. 1, Phoenix, Ariz. 85014

[21] Appl. No.: 148,963

[22] Filed: Nov. 8, 1993

[51] Int. Cl.$^5$ .............................. F01N 7/02; F01N 3/10
[52] U.S. Cl. .................................. 181/232; 181/258; 60/299; 60/302
[58] Field of Search ............... 181/232, 258, 264, 252; 60/299, 302

[56] References Cited

U.S. PATENT DOCUMENTS

| | | | |
|---|---|---|---|
| 3,754,619 | 8/1973 | McCormick | 181/252 |
| 5,043,147 | 8/1991 | Knight | 181/232 X |
| 5,142,864 | 9/1992 | Dunne | 60/274 |
| 5,185,998 | 2/1993 | Brew | 60/299 |

*Primary Examiner*—Michael L. Gellner
*Assistant Examiner*—Khanh Dang

[57] ABSTRACT

An apparatus for purifying air which may act downstream supplement to a catalytic converter of an internal combustion engine for further reducing the hydrocarbon and carbon monoxide gases which the catalytic converter failed to remove. The apparatus comprises a housing filled with volcanic ash over which is directed a turbulent stream of exhaust gases for chemical reaction with the volcanic ash.

9 Claims, 4 Drawing Sheets

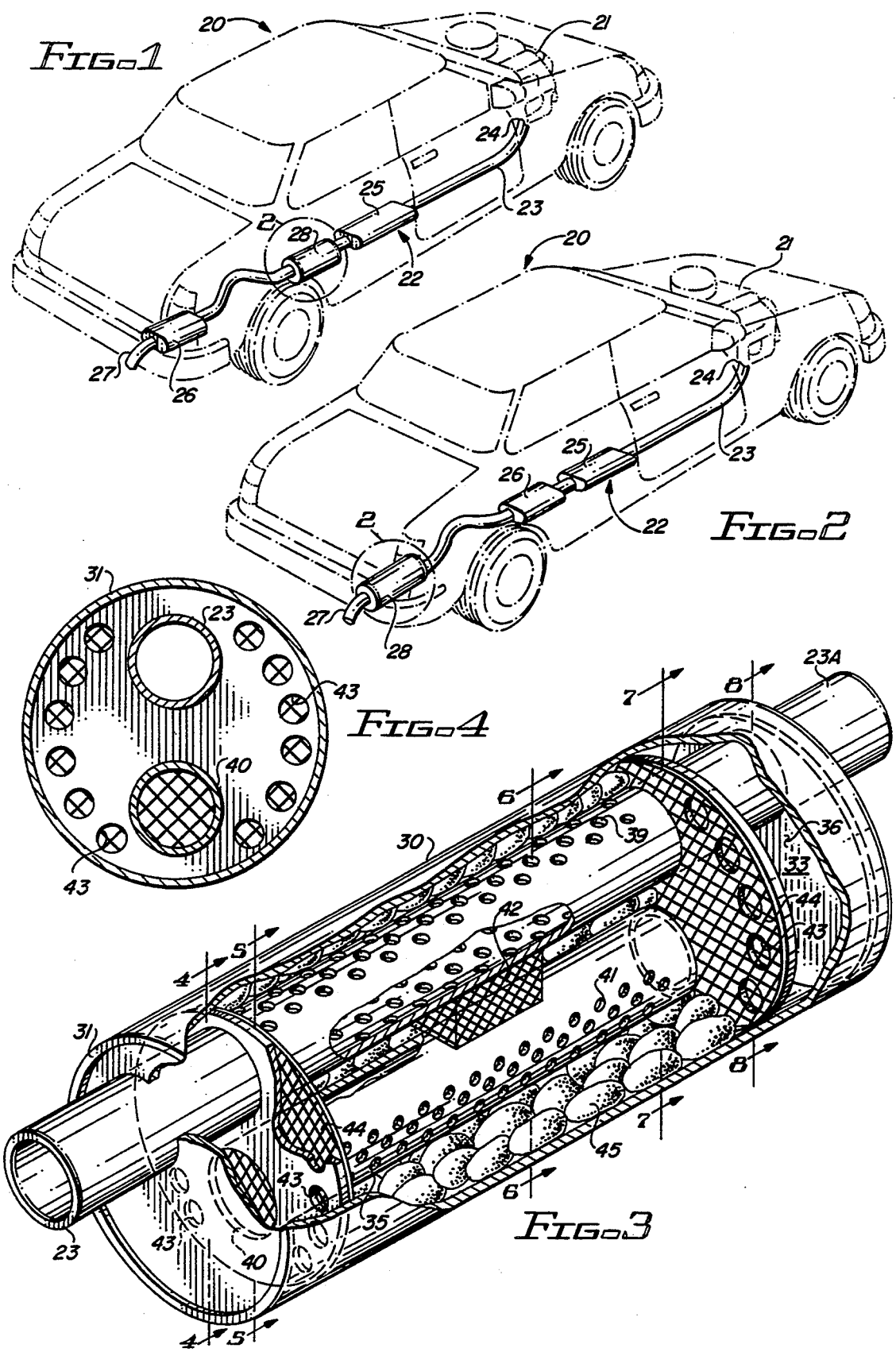

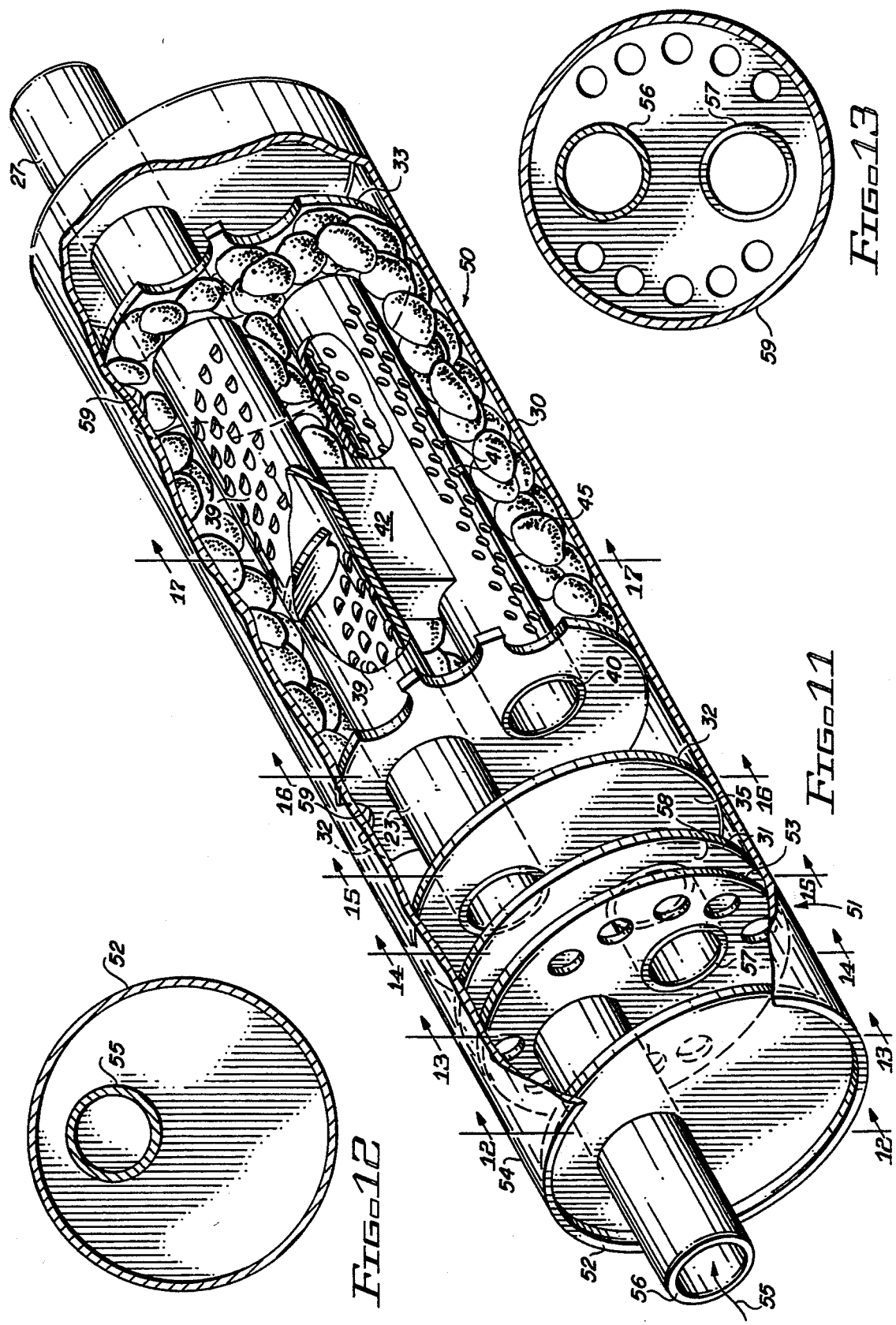

APPARATUS FOR TREATING HYDROCARBON AND CARBON MONOXIDE GASES

BACKGROUND OF THE INVENTION

This invention relates to the treatment of hydrocarbon and carbon monoxide gases issuing from various sources one of which is the gases issuing from a catalytic converter connected to the exhaust of an internal combustion engine. More particularly, this invention is directed to apparatus positioned downstream of the catalytic converter of an internal combustion engine for supplementing the function of the catalytic converter and may be positioned in the gas stream before, in place of or after the muffler.

Current automotive catalytic converters comprise a multichannel substrate having a flow-through channels which are coated with noble metal catalyst materials that convert the pollutant exhaust gases to harmless effluent.

The automotive catalytic converters generally comprise a large, oval-shaped ceramic substrate housed in a metal sleeve or can. The converters connect directly to a manifold exhaust pipe of an internal combustion engine and normally discharges purified gases through a muffler to atmosphere.

The catalytic converter is designed to reduce hydrocarbon (HC) and carbon monoxide (CO) emissions into carbon dioxide and water vapor. The converter also purges oxides of nitrogen (NOx) vapors from the exhaust. It is called catalytic because precious-metal catalysts inside the converter react with these toxic gases on the large surface area of an ingenious honeycomb coated with less than a gram of the catalytic material.

Most vehicles made after 1980 use this so-called monolithic converter. Pre 1980 vintage cars have a pellet-type converter. Pellet converters contain thousands of tiny grains of ceramic reactants that produce a similar result.

Although the catalytic converter has been successful in removing some of the hydrocarbons and carbon monoxide from the exhaust gases of internal combustion engines, there is still a need for removing still more of these toxic gases exiting from the exhaust of the catalytic converter as well as from other sources of air contamination. This can be accomplished with regard to the catalytic converter by uniformly distributing the exhaust gas flow at a point before, after or in place of the muffler to a new add on supplement converter that agitates the flowing exhaust stream of gases and washes it over a mineral substance to further convert the remaining hydrocarbon and carbon monoxide emissions into carbon dioxide and water vapor.

DESCRIPTION OF THE PRIOR ART

U.S. Pat. No. 3,754,619 discloses a low back-pressure, straight through sound attenuating muffler for internal combustion engines comprising a series of spaced annular bodies of sound deadening material, the inner diameters of which define a gas flow path and the side faces of which define chambers within the muffler housing.

U.S. Pat. No. 5,142,864 discloses a process for treating an engine exhaust stream employing a catalyst, an adsorbent bed and a turbocharger.

U.S. Pat. No. 5,185,998 discloses catalytic converter accessory apparatus for improving the converter's efficiency and operational life. The accessory device has a housing disposed in the manifold exhaust pipe, upstream of the catalytic converter. The housing contains a hollow conduit that conveys the exhaust gases of the manifold to the entrance or interface of the catalytic converter. The conduit has a diffuser portion having a baffle plate disposed at the downstream end thereof, just before the converter inlet. The flow is divided into a bifurcated stream of gases that passes through the baffle plate. The outer stream of exhaust gas is caused to swirl as it passes through slots disposed at the end of the conduit ahead of the baffle plate. The major portion of the exhaust stream is caused to pass through a large central aperture in the baffle plate, along with the outer, swirling stream. This major portion of the exhaust stream maintains a substantially linear flow, thus reducing back pressure and turbulence in the overall flow.

SUMMARY OF THE INVENTION

In accordance with the invention claimed, a new and novel apparatus is disclosed for purifying air and which may act as a supplement to the catalytic converter of an internal combustion engine functioning downstream thereof for further reducing the remaining hydrocarbon and carbon monoxide gases which the catalytic converter failed to remove from the exhaust stream of gases into carbon dioxide and water vapor.

It is, therefore, one object of this invention to provide an improved catalytic converter system.

Another object of this invention is to provide an accessory apparatus for use downstream of a catalytic converter for further reducing or catalyzing the exhaust gases of an internal combustion engine.

A further object of this invention is to provide a supplemental catalytic device or apparatus which bathes or washes its exhaust gases received from a catalytic converter over a second catalytic substance that greatly reduces the undesirable hydrocarbons and carbon monoxide gases still existing in the exhaust gases of the catalytic converter.

A still further object of this invention is to provide a new and improved converter mounted downstream of the catalytic converter in the exhaust stream of gases from an internal combustion engine which, as a supplement to the catalytic converter, further reduces the hydrocarbons and carbon monoxide gases of the catalytic converter exhaust into carbon dioxide and water vapors.

Further objects and advantages of this invention will become apparent as the following description proceeds, and the features of novelty which characterize the invention will be pointed out with particularity in the claims annexed to and forming a part of this specification.

BRIEF DESCRIPTION OF THE DRAWINGS

The present invention may be more readily described by reference to the accompanying drawings in which:

FIG. 1 is a perspective view of an automobile in dash lines showing the novel supplemental apparatus disclosed herein immediately downstream of a catalytic converter and upstream of its muffler;

FIG. 2 is a perspective view of the automobile shown in FIG. 1 with the supplemental apparatus disclosed herein positioned downstream of its muffler.

FIG. 3 is a perspective view of the supplemental apparatus partially in section showing the gas flow therethrough;

FIG. 4 is a cross sectional view of FIG. 3 taken along the line 4—4;

FIG. 11 is a modification of the supplemental apparatus shown in FIG. 3;

FIG. 12 Is a cross sectional view of FIG. 11 taken along the line 12—12:

FIG. 13 is a cross sectional view of FIG. 11 taken along the line 13—13:

DESCRIPTION OF THE PREFERRED EMBODIMENT

Figure 5:
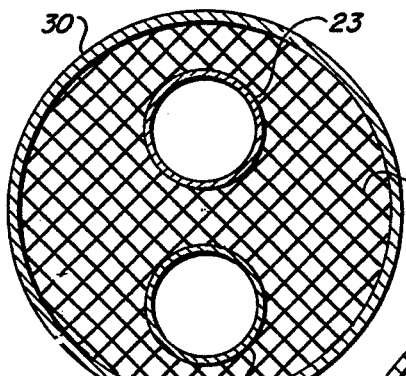
FIG. 5 is a cross sectional view of FIG. 3 taken along the line 5—5.
Figure 6:
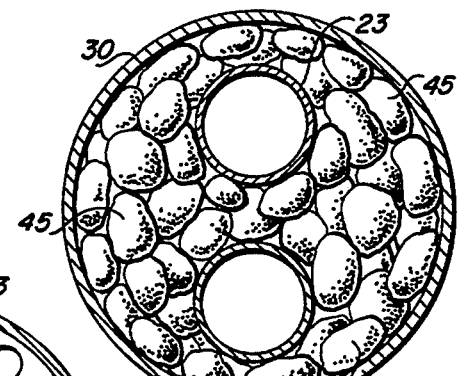
FIG. 6 is a cross sectional view of FIG. 3 taken along the line 6—6.
Figure 7:
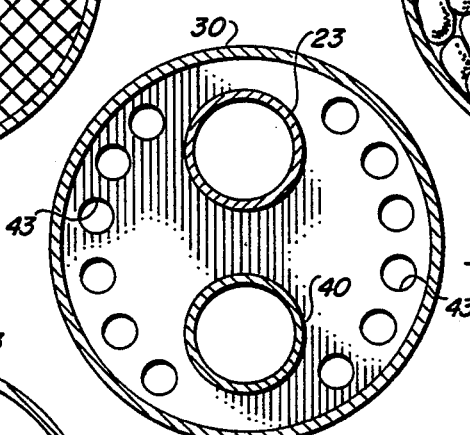
FIG. 7 is a cross sectional view of FIG. 3 taken along the line 7—7.
Figure 8:
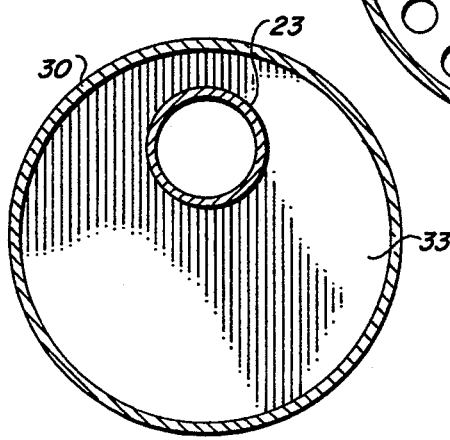
FIG. 8 is a cross sectional view of FIG. 3 taken along the line 8—8.

In accordance with the invention claimed, an improved device is provided for use as a supplement to an automotive catalytic converter system or any other air purifying system for removing pollutants from the exhaust gases whether human or machine generated. This device provides for a turbulent but uniform flow of the exhaust gases from the converter substrate or directly from a source of exhaust gases over a catalyst in a novel way to convert hydrocarbons and carbon monoxide into carbon dioxide and water vapor.

With reference to the drawings, FIGS. 1 and 2 disclose an automobile 20 both diagrammatically showing a motor 21 having an exhaust system 22 comprising a conduit 23 connecting the exhaust port 24 of the automobile through a catalytic converter 25, muffler 26, tail pipe 27 of the automobile to atmosphere. In accordance with the teaching of this invention, a supplemental device such as converter 28 is positioned in the exhaust system of the automobile with FIG. 1 illustrating converter 28 between catalytic converter 25 and muffler 26 while in FIG. 2 converter 28 is positioned downstream of muffler 26.

Motor 21 comprises any internal combustion engine which generates an exhaust gas stream containing noxious components including unburned or thermally degraded hydrocarbons or similar organics. Other noxious components usually present in the exhaust gas include nitrogen oxides and carbon monoxide.

The engine may be fueled by a hydrocarbonaceous fuel. As used in this specification and in the appended claims, the term "hydrocarbonaceous fuel" includes hydrocarbons, alcohols and mixtures thereof. Examples of hydrocarbons which can be used to fuel the engine are the mixtures of hydrocarbons which make up gasoline or diesel fuel. The alcohols which may be used to fuel engines include ethanol and methanol. Mixtures of alcohols and mixtures of alcohols and hydrocarbons can also be used. Engine 21 may consist of a jet engine, gas turbine, internal combustion engine, such as an automobile, truck or bus engine, a diesel engine or the like. The process of this invention is particularly suited for treating an exhaust stream from a gasoline fueled automobile engine.

The engine exhaust stream is flowed through exhaust pipe system 22 and then through catalyst 25. The function of the catalyst is to convert the pollutants in the engine exhaust stream to innocuous components. When the engine is fueled by a hydrocarbon, the catalyst is referred to in the art as a three component control catalyst because it can simultaneously oxidize any residual hydrocarbons present in the engine exhaust stream to carbon dioxide and water, oxidize any residual carbon monoxide to carbon dioxide and reduce any nitric oxide to nitrogen and oxygen.

Although the exhaust gases flowing through the exhaust system of the present day automobiles renders the exhaust gases relatively harmless, i.e., they meet present day limits, they still contain noxious gases which contribute to the contamination of the atmosphere. Accordingly, the supplemental converter 28 is provided to further improve the quality of the air.

Supplemental converter 28 comprises a casing 30 that may have a cylindrical configuration having two pairs of baffles 31, 32 and 33, 34 arranged with one pair at each end of the cylinder and defining a housing 35 in casing 30 between baffles 32 and 34. Apertures are provided one in each of the baffles through which conduit 23 of the exhaust system extends in and out of casing 30.

Baffles 31, 32, and 33, 34 define reservoirs 36 and 37, respectively, therebetween.

The portion of pipe or conduit 23 inside of housing 35 is provided with a plurality of apertures 39 extending in an array or straight line longitudinally along the top and in an array or straight line one hundred and eighty degrees out of phase therewith along the bottom thereof, as shown in FIG. 3.

Figure 10:
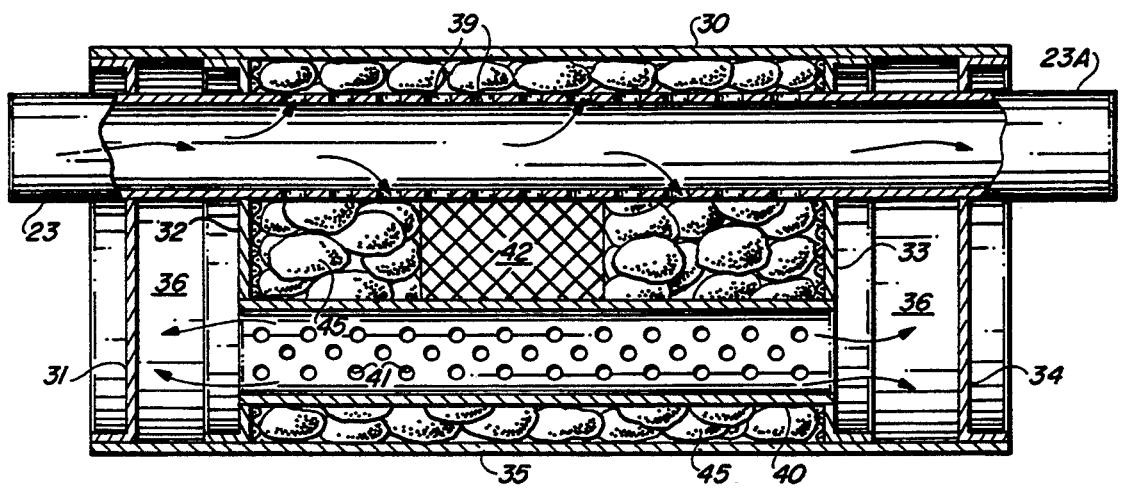
FIG. 10 is a further cross sectional view of the supplemental apparatus for treating the exhaust gases of a catalytic converter showing the separator of FIG. 9 in place.
Figure 14:
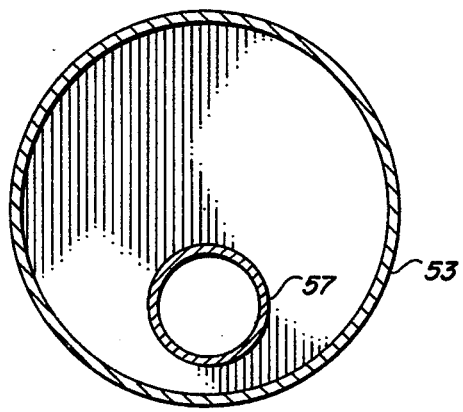
FIG. 14 is a cross sectional view of FIG. 11 taken along the line 14—14.
Figure 15:
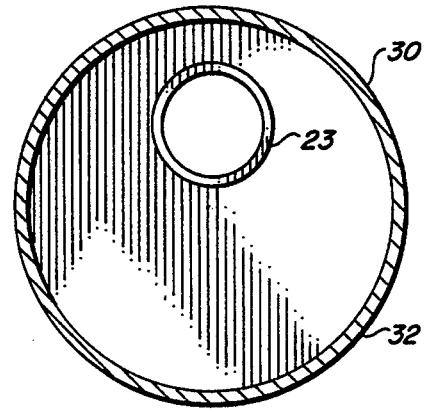
FIG. 15 is a cross sectional view of FIG. 11 taken along the line 15—15.
Figure 16:
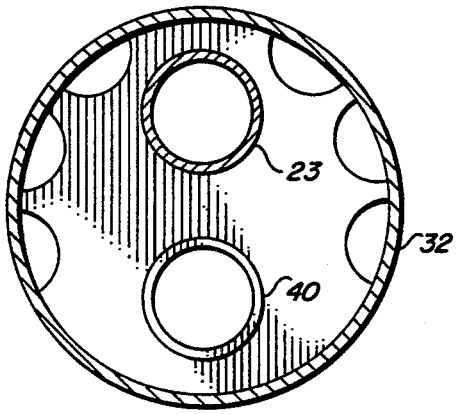
FIG. 16 is a cross sectional view of FIG. 11 taken along the line 16—16.
Figure 17:
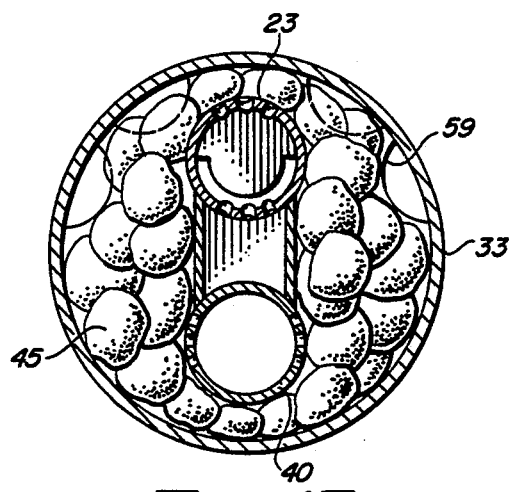
FIG. 17 is a cross sectional view of FIG. 11 taken along the line 17—17.
Figure 18:
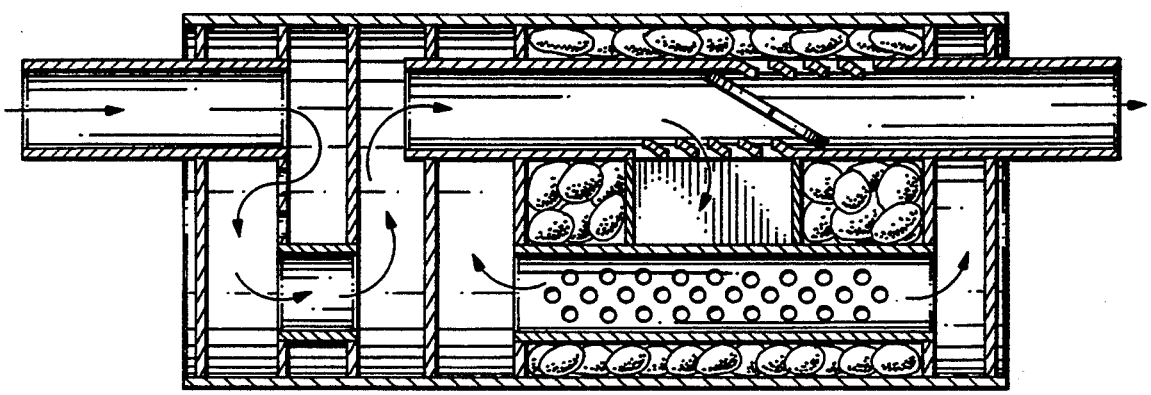
FIG. 18 is a diagrammatic illustration of FIG. 11 showing the gas flow through the device.

A second pipe 40 is positioned in and longitudinally of casing 30 and extends through baffles 32 and 34 opening into reservoirs 36 and 37 as shown more clearly in FIG. 10.

Pipe 40 is provided with a plurality of apertures 41 extending in an array or straight line longitudinally thereof in two spaced rows or arrays each 180 degrees out of phase with the other row or array of apertures 41. As should be noted, apertures 39 in pipe 23 are substantially 90 degrees out of phase with apertures 41 in pipe 40.

Figure 9:
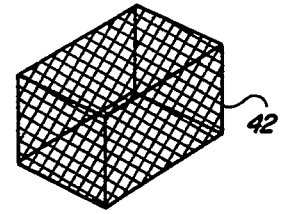
FIG. 9 is a perspective view of separator shown in FIGS. 3 and 10.

Between pipes 23 and 40 within housing 35 is positioned an apertured, slotted or screen wire basket 42. This basket, as shown in FIG. 9, positioned between pipes 23 and 40 is intended to provide a space for the exhaust gases therein to be turbulently agitated as hereinafter explained.

As shown in FIG. 4, baffles 32 and 33 are each provided with a plurality of apertures 43 around their peripheries and each with a screen disk 44 juxtapositioned thereto within housing 35.

In accordance with the invention claimed, hollow spaces inside of housing 30 except in basket 42, are filled with particles of volcanic ash 45. This volcanic ash comprises molten materials including, inter alia, rocks and ashes ejected through the earth's crust by an internal eruption. This ash comprises a molten material resulting from a mixture of all the organic material including minerals that existed in the earth at the point of eruption.

With reference to FIGS. 3 and 10, the exhaust gases from automobile 20 enter the supplemental converter 28 at the left end thereof through pipe or conduit 23 and part of it is discharged out of the exhaust end 23A of conduit 23. At least a part of these gases pass through apertures 39 in the bottom and top of conduit 23 in that portion of the conduit extending between baffles 32 and 33.

As inside pressure in supplemental converter 28 reaches a maximum pounds per square inch (PSI) throughout casing 30, pressure sumps, chambers or reservoirs 36 and 37 maintain a pressure equilibrium as polluted gases from the internal combustion engine are forced out of apertures 3,9 arranged along the top and bottom of conduit 23 into the hollow interior of casing 30.

The exhaust gases flowing out of apertures 39 in the pipe section inside of casing 30 flow over and bathes the particles of porous or granulated particles of volcanic ash 45 on their way through apertures 41 into pipe 40 serving as a sump interconnecting reservoirs 36 and 37. The relatively cleaned air in reservoirs 36 and 37 is then drawn through apertures 43 in baffles 32 and 34 and back into the assembly of particles of volcanic ash 45 and through apertures 39 into conduit 23 and out of exhaust pipe or conduit 23A to atmosphere.

This relatively clean air is forced or drawn out of reservoirs 36 and 37, through apertures 43 in baffles 32 and 33, over the particles or chunks of porous volcanic ash 45 and through the downstream apertures 39 in conduit 23 into casing 30. This gas movement is due to the interior pressure in the supplemental converter and the negative cavitation air flow from the inside of casing 30 through the downstream apertures 39 in pipe 23 and into the exhaust stream exiting through conduit 23A. Pollutant particles in the exhaust gases flowing through the volcanic ash are captured and trapped by the chunks of porous volcanic ash, As there is only a pressure air trade off, i.e., equal pressure in and out of the supplemental converter, the majority of the pollutant particles are not free to escape into the exhaust stream out of conduit 23A, thus resulting in cleaner exhaust gases forced out of conduit 23A to atmosphere.

The utilization of basket 42 between conduit 23 and pipe or conduit 40 is to provide a low pressure cavitation zone where the gases passing through casing 30 may be agitated, thereby causing turbulence of the gases passing through and over the particles of porous volcanic ash to effect a cleaner scrubbing action the gases.

FIGS. 11-17 of the drawings disclose a modification of the supplemental converter shown in FIGS. 1-10 wherein like parts are given the same reference characters.

Supplemental converter 50 shown in FIGS. 11-17 further comprises a built in muffler 51 which may take the place of muffler 26 shown in FIGS. 1 and 2 or may be a supplement thereto.

As shown in FIG. 11, casing 30 is elongated at its left end to comprise a pair of baffles 52 and 53 forming a reservoir 54 into which the incoming exhaust gases 55 are directed by conduit or pipe 56 and from which they are discharged into conduit 23.

The incoming exhaust gases 55 are conducted through conduit or pipe 56 into reservoir 54 where they are then forced into conduit or pipe 57 and from there into reservoir 58 formed between apertured baffles 53 and baffle 31 and from there into conduit 23, as shown in FIG. 10.

It should be noted that baffles 32 and 33 are provided with scallops or circle segments 59 around at least a part of their peripheries to aid in gas movement in casing 30.

With the supplemental converter structure shown in FIGS. 11-17, not only will the noxious gases of an exhaust by product be reduced or substantially eliminated for internal combustion engines but the disclosed converter may be used with any source of noxious gases and be effective in purifying the air.

Although but a few embodiments have been illustrated and described, it will be apparent to those skilled in the art that various changes and modifications may be made therein without departing from the spirit of the invention or from the scope of the appended claims.

What is claimed is:

1. An exhaust device for use in an automobile catalytic converter system, said exhaust device being disposed downstream of the catalytic converter in the exhaust gas stream to further reduce the noxious components of the exhaust gases received from the catalytic converter, said exhaust device comprising:
   a housing defining a chamber for containing a catalytic substance,
   a first conduit connectable at one end to a source of exhaust gases from said catalytic converter system and extending longitudinally through said housing,
   two pairs of spaced baffles each pair defining a reservoir therebetween in said housing at different ends thereof,
   one of the baffles of each reservoir being apertured to provide passageways into said housing,
   a second conduit arranged to extend longitudinally in said housing spaced from said first conduit and interconnecting the reservoirs at each end of said housing,
   each of the conduits being provided with a plurality of aperture means extending therethrough and longitudinal thereof within said housing, and
   volcanic ash particles arranged in said housing between the reservoirs,
   whereby a portion of the exhaust gases flowing through said first conduit flows out of said aperture means therein and into said housing for bathing the volcanic ash and then flows into said second conduit through its aperture means and out each end, thereof into each of the reservoirs,
   the exhaust gases flowing out of said reservoirs flows back into said housing and into said first conduit through a part of its aperture means and then to atmosphere.

2. The exhaust device set forth in claim 1 wherein:
   said aperture means in each of the conduits comprises an array of apertures extending in lines substantially one hundred and eighty degrees apart from each other.

3. The exhaust device set forth in claim 2 wherein:
   said array of apertures in the first conduit are ninety degrees out of phase with the array of apertures in said second conduit.

4. The exhaust device set forth in claim 1 in further combination with:

a hollow wire basket positioned in said housing between the first and second conduits for providing a low pressure cavitation zone in said housing for agitating the exhaust gases.

5. The exhaust device set forth in claim 1 wherein: said one of said baffles of each of said reservoirs is provided with a screen covering inside of said housing for containing the volcanic ash therein.

6. The exhaust device set forth in claim 1 in further combination with:

a muffler arranged in the exhaust gas stream at one end of said housing.

7. The exhaust device set forth in claim 1 in further combination with:

a muffler arranged adjacent to one of said reservoirs at the downstream end of said first conduit.

8. An exhaust device for use in an automobile catalytic converter system, said exhaust device being disposed downstream of the catalytic converter in the exhaust gas stream to further reduce the noxious components of the exhaust gases received from the catalytic converter, said exhaust device comprising:

a housing defining a chamber for containing a catalytic substance, a first conduit connectable at one end to a source of exhaust gases from said catalytic converter system and extending longitudinally through said housing, at least one reservoir formed in said housing at one end thereof, said reservoir providing a passageway into said housing, a second conduit arranged to extend longitudinally in said housing spaced from said first conduit and interconnected with said reservoir, each of the conduits being provided with a plurality of aperture means extending therethrough and longitudinal thereof within said housing, and volcanic ash particles arranged in said housing, whereby a portion of the exhaust gases flowing through said first conduit flows out of said aperture means therein and into said housing for bathing the volcanic ash and then flows into said second conduit through its aperture means and out one end thereof into said reservoir, the exhaust gases flowing out of said reservoir flows back into said housing and into said conduit through a part of its aperture means and then to atmosphere.

9. An exhaust device for use in an automobile catalytic converter system, said exhaust device being disposed downstream of the catalytic converter in the exhaust gas stream to further reduce the noxious components of the exhaust gases received from the catalytic converter, said exhaust device comprising:

a housing defining a chamber for containing a catalytic substance, a first conduit connectable at one end to a source of exhaust gases from said catalytic converter system and extending longitudinally through said housing, a pair of spaced reservoirs one arranged in each end of said housing, each reservoir being apertured to provide a passageway into said housing, a second conduit arranged to extend longitudinally in said housing spaced from said first conduit and interconnecting the reservoir at each end of said housing, each of the conduits being provided with a plurality of aperture means extending therethrough and longitudinal thereof within said housing, and volcanic ash particles arranged in said housing between the reservoirs, whereby a portion of the exhaust gases flowing through said first conduit flows out of said aperture means therein and into said housing for bathing the volcanic ash and then flowing into said second conduit through its aperture means and out each end thereof into each of the reservoirs, the exhaust gases flowing out of the reservoirs into said housing flowing back into said first conduit through a part of its aperture means and to atmosphere.

* * * * *

UNITED STATES PATENT AND TRADEMARK OFFICE
CERTIFICATE OF CORRECTION

PATENT NO. : 5,367,131
DATED : November 22, 1994
INVENTOR(S) : Milton M. Bemel

It is certified that error appears in the above-identified patent and that said Letters Patent are hereby corrected as shown below:

Column 7, line 35    before "conduit" insert ---first---.

Signed and Sealed this

Seventeenth Day of January, 1995

Attest:

BRUCE LEHMAN

Attesting Officer    Commissioner of Patents and Trademarks